Jan. 30, 1962  C. S. FRITZ  3,018,884
ARTIFICIAL TOOTH HOLDER
Filed Feb. 23, 1960
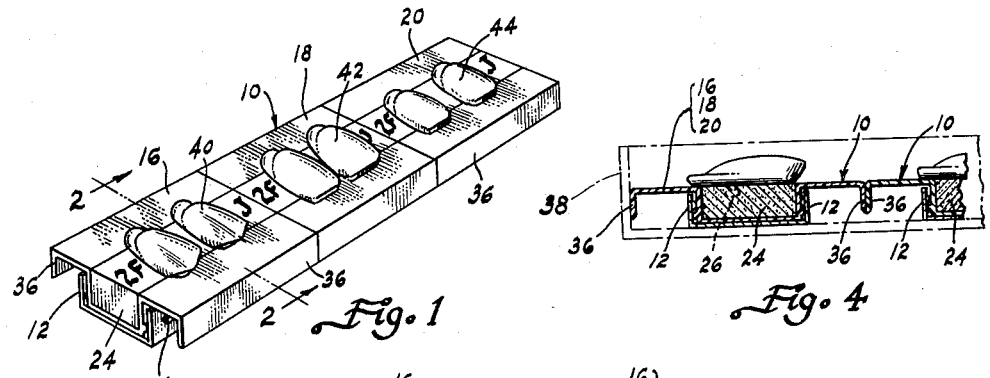
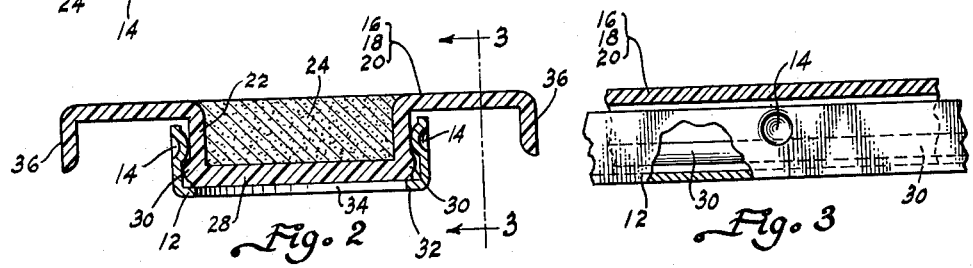
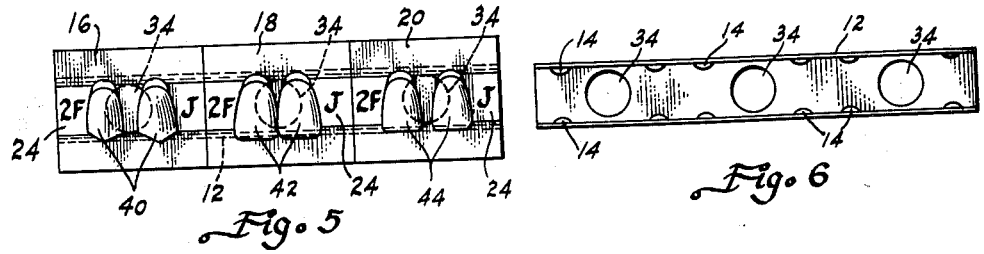
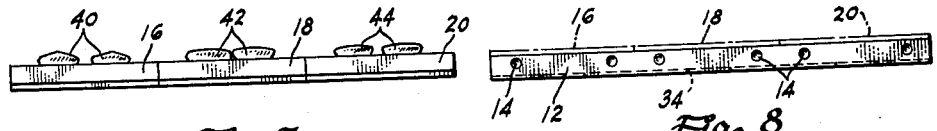
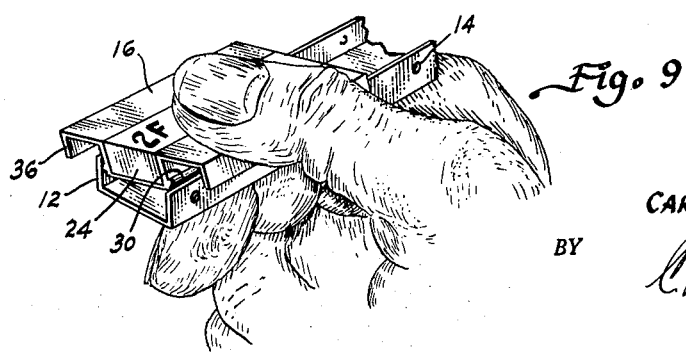
INVENTOR.
CARROLL S. FRITZ
BY
ATTORNEY

United States Patent Office 3,018,884
Patented Jan. 30, 1962

3,018,884
ARTIFICIAL TOOTH HOLDER
Carroll S. Fritz, York, Pa., assignor to The Dentists' Supply Company of New York, York, Pa., a corporation of New York
Filed Feb. 23, 1960, Ser. No. 10,459
8 Claims. (Cl. 206—83)

This invention relates to improvements in artificial tooth holders and, more particularly but without restriction thereto, artificial tooth holders arranged to hold a set of related artificial teeth, such as, for example, anterior teeth, posterior teeth, or otherwise.

It has been customary, for many years, in connection with the manufacture of artificial teeth, to mount the same on a suitable holder, commonly referred to as a tooth card. It has also been quite common, in connection with such tooth cards, to provide either a strip or panel of wax, preferably of a somewhat tacky nature, to which the artificial teeth are affixed by various means, including the pins normally projecting from the pin-shelf of anterior artificial teeth, for example. Such pins are embedded in the wax of the holder and it is convenient to handle artificial teeth of this type in related sets such, for example, as six anterior teeth respectively comprising left and right canine teeth at opposite ends of the set, left and right lateral teeth, inward from the latter, and left and right central teeth in the center of the set of teeth. Usually, a set of such upper anteriors is mounted on one card and a corresponding set of lower anteriors will be mounted on a separate card, in accordance with customary practice.

Posterior artificial teeth, such as the first and second molars, and first and second bicuspids, including both left and right of each, will be mounted on a tooth card in sets of eight, respectively for upper and lower dentures.

When these sets of related teeth are prepared upon such tooth cards by a manufacturer, the assembled teeth in each set usually have either identical or closely related shades, and the proportion, shape and size are related so that, with the other characteristics, they are rendered as close as possible in appearance to natural teeth which they are to replace. In accordance with modern dental aesthetics, however, either a patient or his dentist will sometimes ask for slightly mixed shades or sizes of certain individual teeth, for example, other than those normally furnished, in a set of such teeth, by the manufacturer. Said teeth usually are sold through a dental distributor or at a dental depot, from which such teeth are ordered either by a dentist, or a dental technician, for example, who may be engaged by the dentist to prepare an intra-oral dental restoration for a patient.

When situations of this type arise, it is necessary for the distributor or depot operator to take the required number of teeth desired from one set and additional teeth from another set, in order to accommodate the dentist or laboratory ordering such mixed set, for example. The remaining teeth of the sets from which the former have been selected then are returned to the manufacturer for credit. On other occasions, a dentist or laboratory will order a full set of teeth when only one or two are needed for a restoration, the remaining teeth of the set being returned for credit. When a partial set of artificial teeth are returned to the manufacturer for credit, it is necessary for the manufacturer to remove the remaining teeth from the card, account for them, clean and inspect them especially to be sure that they have not been ground or otherwise changed by anyone prior to being returned to the manufacturer, and secure the missing teeth of the set from stock to prepare a new set of teeth upon a new tooth card.

This arrangement for returning artificial teeth for credit regardless of whether the teeth are in complete sets or only partial sets, is an existing custom which has been followed for many years by most of the leading artificial tooth manufacturers. Nevertheless, it is an expensive procedure and adds materially to the overall cost of merchandising artificial teeth. Heretofore, there has been no apparent way of solving the problem of merchandising the teeth in a less expensive manner and prior efforts to improve the situation have been unsuccessful.

It is the principal object of the present invention to provide a holder for artificial teeth and, in particular, a set of related artificial teeth, which holder is composed of articulated parts, separably connected to each other in certain ways, in accordance with a preferred embodiment of the invention, at least some of said parts having means to secure thereto respectively at least one tooth of a set of related teeth.

It is still another object of the invention to provide an articulated tooth holder of the type referred to in the foregoing object and in which a base member is provided with means extending longitudinally thereof for purposes of receiving and detachably holding a plurality of parts or members, at least some of which parts or members have means to hold respectively at least one tooth of a set of related artificial teeth.

A further object of the invention is to provide, correlative to the immediately foregoing object, a base member in which channel means are arranged to receive and engage complementary portions on the tooth-holding parts or members to detachably connect the same to the base member, whereby said parts or members are held in longitudinal alignment with each other.

Generally, the present invention provides an artificial tooth holder upon which a set of artificial teeth, for example, may have certain teeth of said set, either singly or in combination with other teeth of said set, mounted upon the various articulated parts or members, whereby, when it is desired to furnish only a limited number of teeth of a specific set less than the entire set to a dentist or laboratory customer, such individual teeth or limited number thereof frequently may be furnished upon a tooth-holding member holding less than a complete set and prepared by the manufacturer and supplied to the distributor or depot. Upon removing one or more such parts or members from the assembly on the articulated tooth holder, those which are removed my be replaced by others holding similar teeth and prepared at the factory of the manufacturer, whereby the present costly, current practice of returning partial sets of teeth to a manufacturer for credit may be greatly minimized or substantially eliminated.

Details of the foregoing objects and of the invention are set forth in the following specification and illustrated in the accompanying drawing comprising a part thereof. In the drawing:

FIG. 1 is a perspective view of one embodiment of articulated tooth holder embodying the principles of the invention.

FIG. 2 is an enlarged transverse sectional view of the tooth holder shown in FIG. 1 and taken on the line 2—2 of said figure.

FIG. 3 is a fragmentary side view of the tooth holder shown in FIG. 2, parts of the same being broken away to illustrate certain details thereof.

FIG. 4 is a fragmentary end view illustrating an exemplary arrangement of a plurality of the tooth holders of the type shown in FIG. 1 positioned within a fragmentarily illustrated portion of a drawer or tray of the type used for storage, for example.

FIG. 5 is a top plan view of the embodiment of tooth holder shown in FIG. 1.

FIG. 6 is a top plan view of the channel base member of the embodiment of tooth holder shown in FIGS. 1 through 5.

FIG. 7 is a side elevation of the articulated tooth holder shown in FIGS. 1 and 5.

FIG. 8 is a side elevation of the channel base member shown in FIG. 6.

FIG. 9 is a perspective view illustrating the manner of connecting the tooth-holding members to the channel base member of the embodiment of tooth holder illustrated in FIGS. 1 through 8.

Referring to the invention as illustrated in FIGS. 1 through 9, the articulated holder 10 for artificial teeth comprises an elongated channel base member 12 which may be formed from metal, for example, such as aluminum, or from synthetic resin or any other appropriate material which is relatively rigid and preferably has a reasonable amount of elasticity. The opposite side walls of the channel member 12 have pressure increasing means such as detents 14 pressed inwardly therefrom to comprise part of preferably snap-type separable connecting means, the other part of which will be described hereinafter. If desired, any other appropriate type of snap-type means may be substituted for the detents 14.

The channel base member 12 is arranged to receive a plurality of tooth-holding members 16, 18 and 20, preferably in end-to-end relationship with each other, as shown in FIGS. 1, 5 and 7. The members 16, 18 and 20 may be formed from any suitable material, such as being molded from synthetic resin, stamped and bent from sheet metal, or the like. In the particular illustration, said members are shown as being formed from resin and are provided with channeled or connecting portions 22, the channels of which receive means for holding artificial teeth detachably connected to the members 16, 18 and 20, such as a strip of wax 24. Said wax is reasonably plastic and somewhat tacky for purposes of either adhesively securing artificial teeth detachably thereto, or of receiving conventional tooth pins 26, see FIG. 4, such as conventionally are used in anterior or front artificial teeth.

Opposite sides of the exterior of channeled portions 28 of the tooth-holding members are provided with cooperating ribs 30 which comprise parts of the detachable connecting means referred to above in that the ribs 30 cooperate with the detents 14 of the channel base member 12 in snap-acting relationship to prevent accidental separation of the tooth-holding members 16, 18 and 20 from the channel base member 12, but, nevertheless, permit ready removal of the tooth-holding members from the base member, when desired. To effect such removal, the bottom 32 of the channel base member 12 is provided with a hole 34, in alignment with each of the channeled portions 28 of the tooth-holding members, so that by pressing against the bottoms of said channel portions, through the holes 34, said tooth-holding members readily may be snapped from the channel base member in a manner to disengage the interfitting, snap-type connecting means.

The tooth-holding members 16, 18 and 20 also, preferably, have parallel flanges 36 extending along opposite edges for purposes of abutting adjacent articulated holders 10 when contained in a tray or drawer 38, as shown in exemplary manner in FIG. 4. By use of such flanges or equivalent means, there is no tendency for the laterally extending upper portions of the tooth-holding members to overlap each other when arranged in a drawer, tray or the like.

The individual tooth-holding members 16, 18 and 20 respectively may hold either successive teeth of a set of artificial teeth of predetermined number, such as six anterior teeth, or pairs of teeth of such set. The conventional set of six anterior teeth successively comprise, from left to right, a left cuspid or canine, left lateral, left central, right central, right lateral, and right cuspid or canine. This same arrangement occurs in sets of both upper or lower anterior or front teeth, as manufactured in accordance with today's principles of producing and merchandising artificial teeth. In the preferred embodiment illustrated in FIGS. 1 through 9, only one of several possible arrangements of artificial teeth is shown. This one arrangement comprises left and right cuspid or canine teeth 40 which are secured to the tooth-holding member 16; left and right central teeth 42 which are secured to tooth-holding member 18; and left and right lateral teeth 44 which are secured to the tooth-holding member 20. These pairs of teeth are respectively provided with pins 26, as shown in FIG. 4, and said pins are impressed into the wax securing means 24 which hold the artificial teeth readily separably connected to the tooth-holding members.

By employing the arrangement of artificial teeth in a predetermined set, such as six anterior upper teeth, as shown in FIGS. 1, 5 and 7, it will be seen that it will be quite convenient to dispense, for example, either one of a pair or said pair of left and right canine teeth 40, simply by pressing a finger or instrument through the hole 34 in the tooth base member to pop the tooth-holding member 16 from the base member 12 or engage the size flanges of the member 16 to pull it from base member 12. This will be done, of course, under circumstances where a dentist or dental laboratory desires to order only one or a pair of left and right canine teeth. The same would be true relative to one or a pair of central teeth 42, or one or a pair of lateral teeth 44, which are mounted respectively upon tooth-holding members 18 and 20.

When this arrangement of mounting and dispensing artificial teeth is used, it will be seen that, in the event a very limited number of a complete set of teeth is desired by a dentist or dental laboratory, considerably less than the entire set of teeth may be sold without disturbing those teeth of the complete set which are not desired by the customer. Under such circumstances, it will only be necessary for the distributor or operator of a dental depot to order from the factory a single tooth-holding member 16, 18 or 20 containing the limited number of teeth which have been removed from the entire set, thereby rendering the set complete, without returning the unsold teeth in the remaining tooth-holding members to the factory for reconditioning and replacement, thereby resulting in very extensive and material savings to a tooth manufacturer. It is a simple matter to mount such replacement tooth-holding members in the channeled base member 12, this being accomplished in the manner illustrated in FIG. 9, wherein simple pressure between the thumb and one finger will effectively position and detachably connect the replacement tooth-holding members in the channel base member. Suitable identifying indicia illustrated in the drawing may be placed upon the members 16, 18 and 20, in accordance with customary practice.

The present invention also may be employed to hold a set of artificial teeth in the successive order in which they normally occur in a denture, or in the human mouth, for example, the individual teeth of a set of predetermined number of the six anterior teeth, for example, not being illustrated in the drawing.

While the invention has been described and illustrated in its several preferred embodiments, it should be understood that the invention is not to be limited to the precise details herein illustrated and described, since the same may be carried out in other ways falling within the scope of the invention as claimed.

I claim:

1. A holder for artificial teeth comprising an elongated base means, and a plurality of members articulated separably to said base means for support thereby, said members extending at opposite edges beyond all of said base means in a direction transverse to the longitudinal axis of said base means, and at least one of said members having means to secure artificial teeth detachably thereto.

2. A holder for artificial teeth comprising elongated base means having a channel, and a plurality of members wider than said base means in a direction transverse to the longitudinal axis of said base means and separably connectable to said base means, at least one edge of each member projecting beyond one edge of said channel at the top of said channel and at least some of said members having means thereon operable to secure artificial teeth detachably thereto and said latter means on said members being substantially in longitudinal alignment when said members are supported operatively by said base means.

3. A holder for artificial teeth comprising elongated base means, and a plurality of members separably connected to said base means for support thereby and at least some of said members having channel means in longitudinal alignment with each other when said members are connected to said base means, and wax means in said channel means operable to secure artificial teeth detachably to said members.

4. A holder for artificial teeth comprising in combination, a base member having a channel extending longitudinal thereof, and a plurality of tooth-holding members wider at the top in a transverse direction than said base member and projecting at opposite edges beyond said channel of said base member and said members also having connecting portions detachably received within said channel and at least some of said members having means to secure artificial teeth detachably thereto between the opposite edges thereof.

5. A holder for artificial teeth comprising in combination, a channel-shaped base member, a plurality of tooth-holding members having portions depending from the tops thereof removably positioned in longitudinal alignment within the channel of said base member, the tops of said tooth-holding members extending laterally beyond said base member at both opposite edges parallel to the axis of said channel, and snap-acting means operable between said base member and said tooth-holding members to detachably secure said tooth-holding members to said base member.

6. A holder for artificial teeth comprising in combination, a base member having a channel extending longitudinally thereof, and a plurality of tooth-holding members having channel-shaped connecting portions depending from the tops thereof and detachably received within said channel for connection to said base member in longitudinal alignment with each other, said members having top flanges extending laterally in opposite directions from the channels therein substantially within a common plane and at least some of said members having means to secure artificial teeth detachably thereto.

7. A holder for artificial teeth comprising in combination, a base member having a channel extending longitudinally thereof, a plurality of tooth-holding members respectively shaped to have channeled portions complementary externally to said channel in said base member and detachably received within said channel to position said holding members substantially in longitudinal alignment with each other, at least some of said members having means to secure artificial teeth detachably thereto, and flanges extending substantially perpendicularly from opposite edges of said tooth-holding members in the same direction from the upper surfaces thereof and laterally beyond the channel of said base member, thereby to prevent overlapping of said tooth holder with another when pushed against the side thereof.

8. A holder for artificial teeth comprising in combination, a base member having a channel extending longitudinally thereof, a plurality of tooth-holding members respectively shaped to have channeled portions intermediate the side edges thereof complementary externally to said channel in said member and said portions being received within said channel in said base member to position said holding members detachably connected substantially in longitudinal alignment upon said base member, the tops of said holding members extending laterally beyond said channeled portions and also overlying said base member and extending therebeyond, and wax means within the channeled portions of said holding members operable to secure artificial teeth detachably to said holding members.

References Cited in the file of this patent
UNITED STATES PATENTS

| | | |
|---|---|---|
| 953,290 | Rebentisch | Mar. 29, 1910 |
| 1,157,041 | Reynolds | Oct. 19, 1915 |
| 1,276,326 | Casper | Aug. 20, 1918 |
| 1,655,183 | Gibson | Jan. 3, 1928 |
| 1,656,685 | Thompson | Jan. 17, 1928 |
| 1,916,119 | Schwartz et al. | June 27, 1933 |
| 2,110,461 | Chibnik | Mar. 8, 1938 |
| 2,630,213 | Finkel | Mar. 3, 1953 |